US009052881B2

(12) United States Patent
Gatts et al.

(10) Patent No.: US 9,052,881 B2
(45) Date of Patent: Jun. 9, 2015

(54) DISCOVERING THERMAL RELATIONSHIPS IN DATA PROCESSING ENVIRONMENTS

(75) Inventors: Todd Dickson Gatts, Raleigh, NC (US); Denilson Nastacio, Raleigh, NC (US); Preethi C. Mohan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 455 days.

(21) Appl. No.: 13/459,338

(22) Filed: Apr. 30, 2012

(65) Prior Publication Data

US 2012/0215483 A1 Aug. 23, 2012

Related U.S. Application Data

(63) Continuation of application No. 12/858,645, filed on Aug. 18, 2010.

(51) Int. Cl.
*G06F 1/20* (2006.01)

(52) U.S. Cl.
CPC ............... *G06F 1/206* (2013.01); *G06F 1/203* (2013.01); *G06F 1/20* (2013.01)

(58) Field of Classification Search
CPC ........... G06F 1/206; G06F 1/20–1/203; G01K 7/42–7/427
USPC ........................ 702/99–100, 127, 130, 136; 700/275–276, 299–300; 222/54
See application file for complete search history.

(56) References Cited

U.S. PATENT DOCUMENTS

| | | |
|---|---|---|
| 5,170,935 A | 12/1992 | Federspiel et al. |
| 5,491,649 A | 2/1996 | Friday, Jr. et al. |
| 5,918,200 A | 6/1999 | Tsutsui et al. |
| 6,167,316 A | 12/2000 | Gloudeman et al. |
| H0001940 H | 2/2001 | Lohn, III |

(Continued)

FOREIGN PATENT DOCUMENTS

IN 200800121 I3 10/2009

OTHER PUBLICATIONS

Jonas et al; On developing a fast, cost-effective and non-invasive method to derive data center thermal maps Cluster Computing, 2007 IEEE International Conference on Publication Year: 2007 , pp. 474-475.

Hamann et al; Rapid Three-Dimensional Thermal Characterization of Large-Scale Computing Facilities Components and Packaging Technologies, IEEE Transactions on vol. 31 , Issue: 2 Publication Year: 2008 , pp. 444-448.

(Continued)

*Primary Examiner* — Mischita Henson
(74) *Attorney, Agent, or Firm* — Garg Law Firm, PLLC; Rakesh Garg; Parashos Kalaitzis

(57) ABSTRACT

A method for discovering thermal relationships in a data processing environment is provided in the illustrative embodiments. An output temperature of a cooling unit operating in the data processing environment is changed from a previous output temperature to a new output temperature. The difference between the previous and the new output temperatures is a change in the output temperature. A change in an ambient temperature proximate to a data processing system is measured. The change in the ambient temperature is a difference between a previous ambient temperature and a new ambient temperature. An expression that represents a relationship between the change in the output temperature and corresponding change in the ambient temperature is determined. The expression is used to determine a cooling correspondence between the cooling unit and the data processing system.

6 Claims, 3 Drawing Sheets

(56) References Cited

U.S. PATENT DOCUMENTS

| | | |
|---|---|---|
| 7,194,641 B2 | 3/2007 | Hack |
| 7,295,897 B2 | 11/2007 | Marando et al. |
| 7,567,844 B2 | 7/2009 | Thomas et al. |
| 7,933,737 B2 | 4/2011 | Gross et al. |
| 2003/0040842 A1 | 2/2003 | Poth |
| 2003/0115024 A1 | 6/2003 | Snevely |
| 2003/0200050 A1 | 10/2003 | Sharma et al. |
| 2003/0226004 A1 | 12/2003 | Abbondanzio et al. |
| 2004/0132398 A1 | 7/2004 | Sharp et al. |
| 2006/0097063 A1 | 5/2006 | Zeevi |
| 2006/0168975 A1 | 8/2006 | Malone et al. |
| 2008/0239539 A1 | 10/2008 | Hamann et al. |
| 2008/0281551 A1 | 11/2008 | Hamann et al. |
| 2009/0132097 A1 | 5/2009 | Sharma et al. |
| 2009/0216381 A1 | 8/2009 | Gooch et al. |
| 2009/0326879 A1 | 12/2009 | Hamann et al. |
| 2010/0057259 A1 | 3/2010 | Dawson et al. |
| 2012/0046899 A1* | 2/2012 | Gatts et al. .................. 702/130 |

OTHER PUBLICATIONS

IBM, IPCOM000174273D: "Apparatus and Method of Temperature-Sensitive Virtual Servers Rack Adjusting within Data Center", Sep. 5, 2008.

IBM, IPCOM000135036D: "Dynamic Thermal Mapping and Trend Analysis As a Control Mechanism for HVAC Systems in Data Centers", Mar. 27, 2006.

Moore et al; "Weatherman: Automated, Online and Predictive Thermal Mapping and Management for Data Centers", Autonomic Computing, 2006. ICAC '06. IEEE International Conference on Publication Year: 2006 , pp. 155-164.

Nathuji et al; "Exploiting Platform Heterogeneity for Power Efficient Data Centers", Autonomic Computing, 2007. ICAC '07. Fourth International Conference on Publication Year: 2007 , pp. 5-5.

Schmidt et al; "Challenges of data center thermal management", IBM Journal of Research and Development; v49, i4, 2005, pp. 709-723.

IBM, IPCOM000188706D: "Method and system of automatic and intelligent power allocation in chassis", Oct. 20, 2009.

* cited by examiner

DISCOVERING THERMAL RELATIONSHIPS IN DATA PROCESSING ENVIRONMENTS

RELATED APPLICATIONS

The present invention is related to similar subject matter of co-pending and commonly assigned U.S. patent application Ser. No. 12/858,774 entitled "THERMAL RELATIONSHIPS BASED WORKLOAD PLANNING," filed on Aug. 18, 2010, which is hereby incorporated by reference.

BACKGROUND OF THE INVENTION

1. Field of the Invention

The present invention relates generally to an improved data processing system, and in particular, to a computer implemented method for operating a data processing environment with improved efficiency. More particularly, the present invention relates to a computer implemented method for discovering thermal relationships existing between data processing systems and cooling equipment in a data processing environment.

2. Description of the Related Art

Data processing environments, such as data centers, often include several data processing systems and facilities equipment. The data processing systems perform or support the computational activities of the data processing environment and the facilities equipment maintain the data processing systems within operating parameters such as by maintaining desirable temperature, or ensuring adequate power supply.

One type of facilities equipment may be classified as cooling unit or cooling equipment. A cooling unit is any equipment that facilitates the dissipation of heat generated as a byproduct of operating the data processing systems in the data processing environment. An exhaust fan, an air conditioning unit, air ducts, thermostats, and liquid radiator units are all examples of cooling equipment.

Often, a data processing environment employs multiple cooling units to maintain desirable temperatures within the data processing environment. Normally, the data processing environment may also include several data processing systems, which generate the heat that the cooling units dissipate. The cooling units are expected to maintain the air in the data processing environment at a desirable temperature.

SUMMARY OF THE INVENTION

The illustrative embodiments provide a method for discovering thermal relationships in a data processing environment. An embodiment changes an output temperature of a cooling unit operating in the data processing environment from a previous output temperature to a new output temperature, the difference between the previous and the new output temperatures being a change in the output temperature. The embodiment measures a change in an ambient temperature proximate to a data processing system, the change in the ambient temperature being a difference between a previous ambient temperature and a new ambient temperature. The embodiment determines an expression that represents a relationship between the change in the output temperature and corresponding change in the ambient temperature. The embodiment uses the expression to determine a cooling correspondence between the cooling unit and the data processing system.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
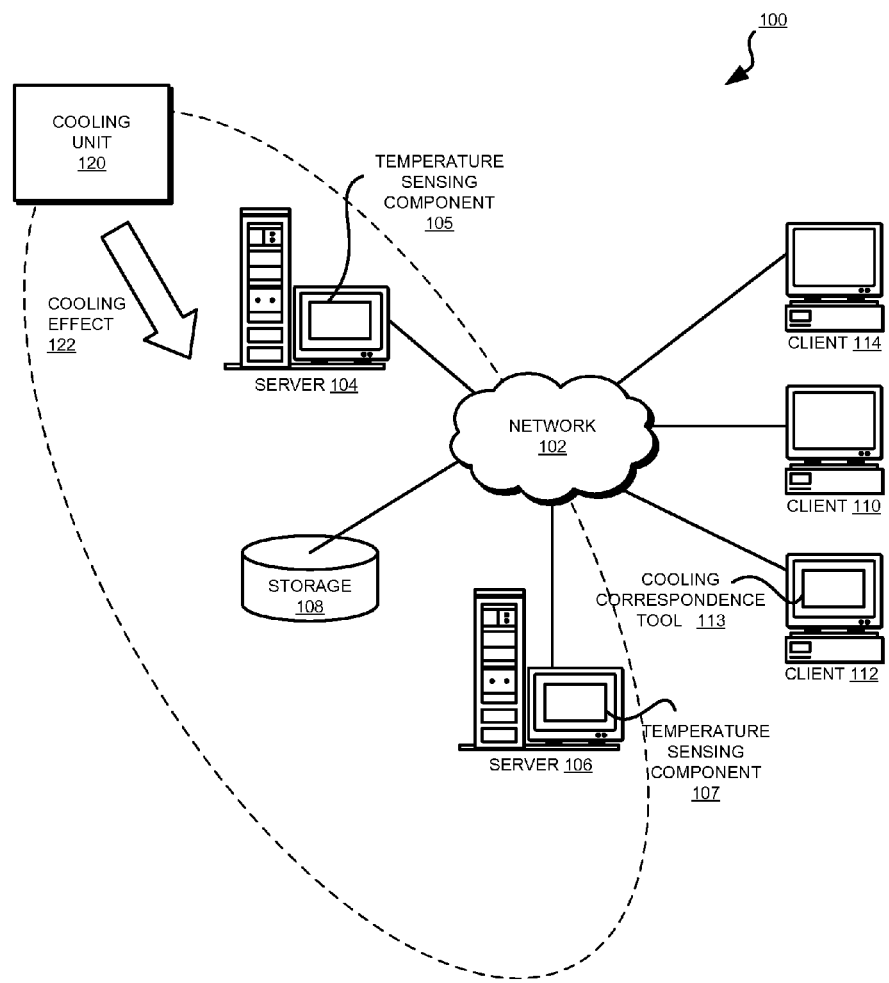
FIG. 1 depicts a pictorial representation of a network of data processing systems in which the illustrative embodiments may be implemented.

The invention recognizes that new data processing systems may be added to a data processing environment. The additional heat contributed by the new data processing systems may have to be dissipated by using the cooling capacity of existing cooling units.

The invention also recognizes that data processing systems are often relocated from one area of the data processing environment to another, such as for reconfiguring a client's rack. The invention recognizes that when a data processing system, a heat source, is physically relocated, the data processing system's dependency on the cooling units may change. For example, the data processing system may be closer to one cooling unit as compared to another cooling unit. Accordingly, the data processing system's heat dissipation may be affected more by one cooling unit versus another.

The invention further recognizes that cooling units may be added or relocated in a data processing environment. The adding, removing, or relocating of cooling units may also affect cooling of data processing systems in the data processing environment in a similar manner.

The invention recognizes that adequate cooling of the data processing systems operating in a data processing environment is not only important from a facilities management point of view but also from a data processing system performance point of view. It is a well-known fact that performance of data processing systems deteriorate if the ambient temperature exceeds a certain threshold. Therefore, the invention recognizes that determining a relationship between a cooling unit and a data processing system is important for changing either the configuration of the data processing systems in the data processing environment or the configuration of the cooling units in the data processing environment.

The illustrative embodiments used to describe the invention generally address and solve the above-described problems and other problems related to thermal conditions in data processing environments. The illustrative embodiments of the invention provide a method for discovering thermal relationships in a data processing environment. An embodiment of the invention may be used for answering the question—which cooling units contributed to cooling of a data processing system, and to what extent? An embodiment may also be used for answering the converse—which data processing system contributes to what proportion of the load on a cooling unit?

An embodiment may enable a weighted mapping of the data processing systems to the cooling units configured in a data processing environment. Such weighted mappings represent the thermal relationships between various data processing systems and various cooling units that may be configured in the data processing environment at a given time.

An embodiment may enable predicting effects on data processing systems' performance, cooling units' performance, or both, based on planned moves, additions, or changes of equipment. For example, using an embodiment, an administrator may be able to determine whether shutting down a cooling unit for maintenance will adversely affect the performance of a particular data processing system. As another example, an embodiment may enable an administrator to relocate a data processing system to utilize available cooling capacity of a certain cooling unit and improve the data processing system's performance without increasing operating costs.

The illustrative embodiments are described with respect to certain data only as examples. Such descriptions are not intended to be limiting on the invention. For example, an illustrative embodiment described with respect to adjusting an output air temperature of a cooling unit can be implemented by adjusting a duty cycle of the cooling unit, in a similar manner within the scope of the invention.

Furthermore, the illustrative embodiments may be implemented with respect to any type of data processing system. For example, an embodiment of the invention may be implemented with respect to any type of client system, server system, platform, or a combination thereof.

The illustrative embodiments are further described with respect to certain configurations only as examples. Such descriptions are not intended to be limiting on the invention. For example, an illustrative embodiment described with respect to a heating ventilation and air conditioning (HVAC) type cooling unit can be implemented using rack mounted cooling unit in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
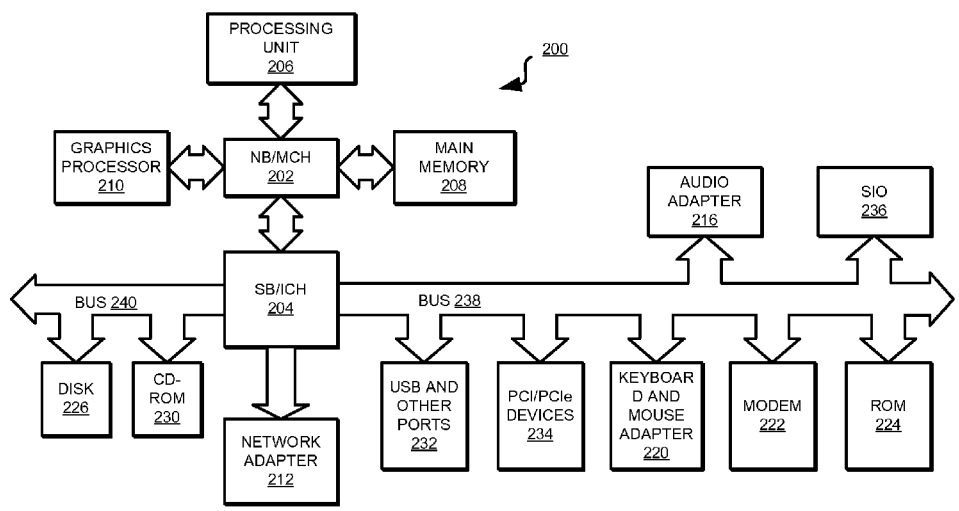
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Servers 104 and 106 may include temperature sensing components 105 and 107 respectively. Temperature sensing components 105 and 107 may each be a temperature measuring device, a temperature measuring software application, or a combination thereof, installed in or associated with servers 104 and 106 respectively. Client 112 may include cooling correspondence tool 113. Cooling correspondence tool 113 may be an embodiment of the invention implemented as an application for computing the weighted mapping or correspondence—the thermal relationship—between a data processing system, such as server 104, and a cooling unit, such as cooling unit 120. Cooling unit 120 may provide cooling effect 122, which may be a reduction in the ambient air temperature in the vicinity of certain data processing systems in data processing environment 100. For example, cooling effect 122 may cause cooling of servers 104 and 106, storage 108, and some networking equipment in network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
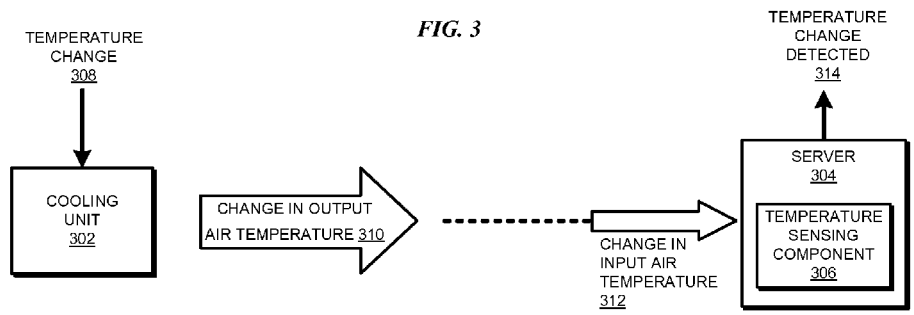
FIG. 3 depicts a block diagram of an example configuration for discovering thermal relationships in a data processing environment in accordance with an illustrative embodiment.

With reference to FIG. 3, this figure depicts a block diagram of an example configuration for discovering thermal relationships in a data processing environment in accordance with an illustrative embodiment. Cooling unit 302 may be similar to cooling unit 120 in FIG. 1. Server 304 and temperature sensing component 306 may be similar to server 104 and temperature sensing component 105 respectively in FIG. 1.

In accordance with an embodiment, temperature change 308 is effected at cooling unit 302. For example, in one embodiment, temperature change 308 may be effected by setting the output temperature setting to a lower than previous value. In another embodiment, temperature change 308 may be effected by altering a baffling position or changing a fan speed. In another embodiment, temperature change 308 may be effected by altering a duty cycle of cooling unit 302, by changing the ON and OFF periods of cooling unit 302. Temperature change 308 may be caused in any manner suitable for particular cooling unit 302 within the scope of the invention.

Change in output air temperature 310 of cooling unit 302 occurs as a result of temperature change 308. For example, a three degrees drop may be observed as change 310 corresponding to a three degrees temperature change 308.

Change in output air temperature 310 may diminish over a distance between cooling unit 302 and server 304. Change in input air temperature 312 may be the observed change in the temperature of the air flowing in or around server 304.

Temperature sensing component 306 may detect change 312 and output temperature change detected 314. For example, for a three degrees drop in temperature change 308, change in input air temperature 312 may only be one and one half degrees. Temperature change detected 314 may be the measured one and one half degrees drop in the input air temperature as compared to a previously measured input air temperature.

For temperature change detected 314 to be a reliable indicator of the changed input air temperature, temperature sensing component 306 should be configured to read the input air temperature and produce temperature change detected 314 reading after a period has elapsed since temperature change 308. Such a period may be configured according to particular implementation and should be sufficient to allow the air temperature in the vicinity of server 304 to stabilize after temperature change 308 within a predetermined tolerance.

Figure 4:
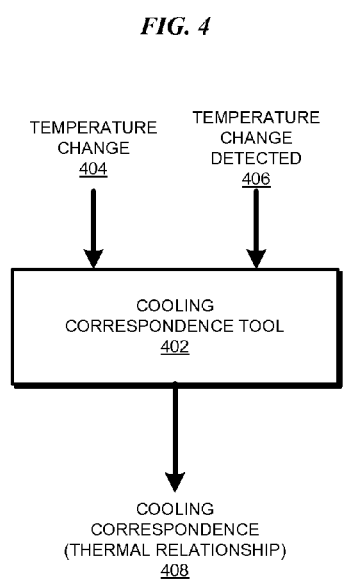
FIG. 4 depicts a block diagram of an example configuration of a cooling correspondence tool in accordance with an illustrative embodiment.

With reference to FIG. 4, this figure depicts a block diagram of an example configuration of a cooling correspondence tool in accordance with an illustrative embodiment. Cooling correspondence tool 402 may be implemented as cooling correspondence tool 113 in FIG. 1.

Temperature change 404 may be the value of temperature change 308 in FIG. 3, forming an input to cooling correspondence tool 402. Temperature change detected 406 may be the value of temperature change detected 314 in FIG. 4, forming another input to cooling correspondence tool 402.

Using inputs 404 and 406, cooling correspondence tool 402 determines cooling correspondence 408. Cooling correspondence 408 is the thermal relationship between the cooling unit where temperature change 404 was applied and the data processing system where temperature change detected 406 was detected.

As a continuation of the previous temperature change example, in temperature change 404 were three degrees, and temperature change detected 406 were one and one half degrees, cooling correspondence may be a ratio of temperature change detected 406 and temperature change 404. Accordingly, for this example, cooling correspondence may be 0.5 (1.5 divided by 3). In other words, a data processing system where temperature change detected 406 is detected experiences only fifty percent of the change in cooling caused by the cooling unit where temperature change 404 is made.

A ratio of input 404 and 406 as cooling correspondence 408 is described only as an example and is not intended to be limiting on the invention. For example, additional inputs may be provided to cooling correspondence tool 402. For example, through trial and error or another method, it may be known smaller than a threshold temperature change 404 results in temperature change detected 406 according to one proportion, but a larger than a threshold temperature change 404 results in a different proportional temperature change detected 406.

For example, if temperature change 404 is three degrees, temperature change detected is one and one half degrees, but if temperature change is ten degrees, temperature change detected may be seven degrees. Ambient factors, atmospheric factors, other cooling units' duty cycles and settings, condition of equipment such as a filtering device, and many other factors may cause such variance in the proportion between temperature change 404 and temperature change detected 406.

Accordingly, additional inputs, such as a constant or coefficient value to use in the computation of cooling correspondence 408 are contemplated for cooling correspondence tool 402. One method of determining an accurate cooling correspondence between a cooling unit and a data processing system may benefit from minimizing or eliminating other factors that may affect temperature change detected 406. Temperature change 404 may be assigned different values and corresponding temperature change detected value 406 may be noted while the other factors are minimized or eliminated. A curve may be plotted with the corresponding values of temperature change 404 and temperature change detected 406. A mathematical expression for representing the curve may be determined by using any known methods. The mathematical expression may then be used for determining cooling correspondence 408.

Additional inputs may also be provided to cooling correspondence tool 402 according to the mathematical expression. For example, when a single cooling unit cannot be operated with other cooling units minimized or eliminated, the mathematical expression may require output temperatures of the other operating cooling units to output an accurate value for cooling correspondence 408. Such output temperatures of the other cooling units may serve as additional inputs to cooling correspondence tool 402.

Figure 5:
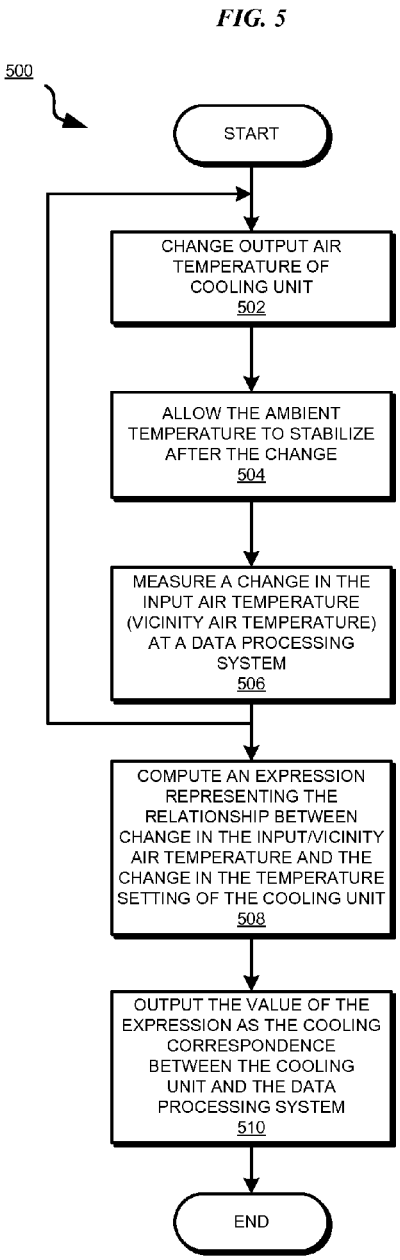
FIG. 5 depicts a flowchart of a process of discovering thermal relationship between a cooling unit and a data processing system in accordance with an illustrative embodiment.

With reference to FIG. 5, this figure depicts a flowchart of a process of discovering thermal relationship between a cooling unit and a data processing system in accordance with an illustrative embodiment. Process 500 may be implemented in cooling correspondence tool 402 in FIG. 4.

Process 500 begins by changing the output air temperature of a cooling unit (step 502). Process 500 allows the ambient temperature to stabilize after the change (step 504). Process 500 measures a change in the input air temperature, or the vicinity air temperature, of a data processing system (step 506). The change in step 506 is in comparison to an input air temperature before the change in step 502 was made.

Process 500 may repeat steps 502-506 any number of times, and record the values of changes in step 502 and 506 for each change. Using the recorded values, process 500 computes an expression that represents the relationship between the change in the input/vicinity air temperature at the data processing system and the change in the cooling unit's temperature (step 508).

Process 500 may output the value of the expression as the cooling correspondence between the cooling unit and the data processing system (step 510). Process 500 ends thereafter. An embodiment may produce the cooling correspondence value at a certain output air temperature of the cooling unit.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method is provided in the illustrative embodiments for discovering thermal relationships in a data processing environment. Using an embodiment of the invention, thermal relationships between heat sources—the data processing systems—and cooling units can be created. Such thermal relationships provide information about how the cooling capacity of each cooling unit separately, and of the cooling equipment of a data processing environment as a whole, is being utilized. Thermal relationships discovered by an embodiment can be used to, for example, improve cooling capacity utilization, predict cooling capacity overload, predict data processing system underperformance, and configure data processing systems to use the available cooling capacity optimally for the workload that is to be executed.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for discovering thermal relationships in a data processing environment, the computer implemented method comprising:
  changing an output temperature of a cooling unit operating in the data processing environment from a previous output temperature to a new output temperature, wherein the difference between the previous and the new output temperatures is a change in the output temperature, wherein the cooling unit is separate from and provides cooling to a plurality of data processing systems in the data processing environment;
  measuring a change in an ambient temperature proximate to a data processing system, the plurality of data processing systems including the data processing system, wherein the change in the ambient temperature is a difference between a previous ambient temperature and a new ambient temperature;

determining, using a processor and a memory, an expression that represents a relationship between the change in the output temperature and corresponding change in the ambient temperature;

evaluating the expression, using the processor and the memory, to determine a cooling correspondence between the cooling unit and the data processing system;

computing, using the relationship, a fraction of cooling contributed by the cooling unit to the data processing system and a fraction of thermal load contributed by the data processing system from the plurality of data processing systems to the cooling unit; and utilizing the computed fraction of the cooling and the computed fraction of the thermal load to modify a configuration of the data processing system for a workload.

2. The computer implemented method of claim 1, further comprising:
repeating the changing and the measuring to generate plurality of values of change in the output temperature and corresponding change in the ambient temperature, where the plurality of values are used in determining the expression.

3. The computer implemented method of claim 1, wherein the cooling correspondence is determined from evaluating the expression at a given output temperature of the cooling unit.

4. The computer implemented method of claim 1, further comprising: allowing the ambient temperature to stabilize at a new temperature resulting from the changing.

5. The computer implemented method of claim 1, wherein the new ambient temperature fluctuates within a tolerance value.

6. The computer implemented method of claim 1, wherein the ambient temperature is an input air temperature of the data processing system, as determined by a temperature sensing component of the data processing system.

* * * * *